United States Patent [19]

High, Jr. et al.

[11] Patent Number: 4,744,523
[45] Date of Patent: May 17, 1988

[54] WHOLE EAR CORN CONVERSION METHOD EMPLOYING BREAKING OF WHOLE EARS BEFORE SHELLING KERNELS AND GRINDING COBS

[75] Inventors: Samuel E. High, Jr., Lititz; Aquila D. Mast, Lancaster, both of Pa.

[73] Assignee: Feedmobile, Inc., Lititz, Pa.

[21] Appl. No.: 885,058

[22] Filed: Jul. 14, 1986

Related U.S. Application Data

[62] Division of Ser. No. 599,129, Apr. 11, 1984.

[51] Int. Cl.$^4$ .................................... B02C 19/12
[52] U.S. Cl. .................................... 241/3; 241/7; 241/10
[58] Field of Search .................. 241/3, 101.4, 101.7, 241/7, 10, 78, 101.6, 81, 159; 130/6, 5 R, 33, 9 R-9 F, 27 T, 27 R

[56] References Cited

U.S. PATENT DOCUMENTS 465,134 12/1891 Hobler et al. .................... 130/6
3,530,913 9/1970 Kline et al. .................... 241/7 X Primary Examiner—Mark Rosenbaum
Attorney, Agent, or Firm—Michael R. Swartz; John R. Flanagan

[57] ABSTRACT

Whole ears of corn are converted to a desired particulate feed material in a machine which first preconditions the whole ear by breaking it into several smaller pieces before its cob and kernels are separated from one another and respectively ground and cracked in other operative units of the machine, and then recombined into the desired feed material composed of the parts of the whole ear.

4 Claims, 3 Drawing Sheets

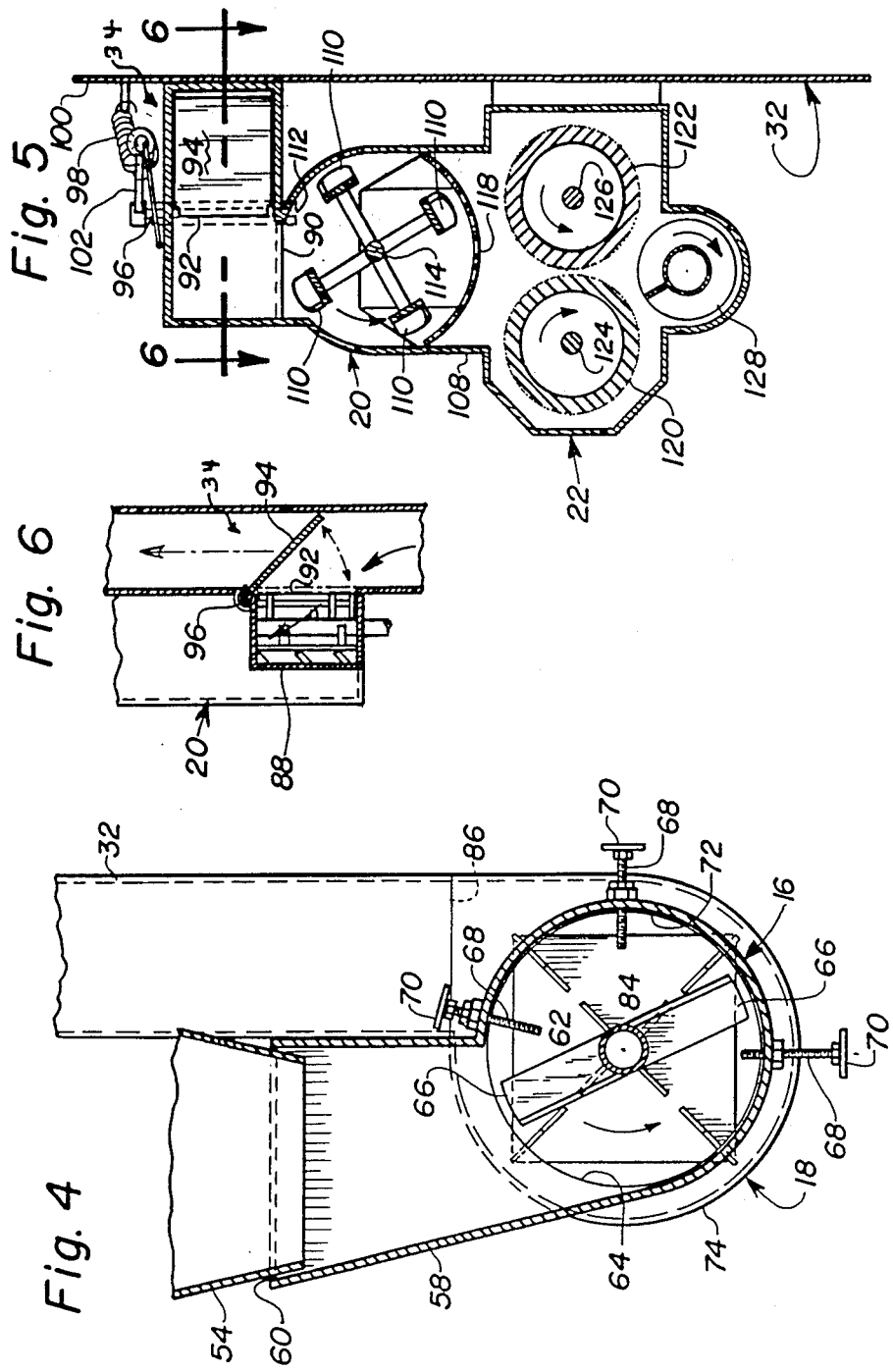

WHOLE EAR CORN CONVERSION METHOD EMPLOYING BREAKING OF WHOLE EARS BEFORE SHELLING KERNELS AND GRINDING COBS

This is a divisional of co-pending application Ser. No. 06/599,129 filed on 4-11-84.

BACKGROUND OF THE INVENTION

1. Field of the Invention

The present invention relates generally to feed material processing and, more particularly, is concerned with apparatus and method for converting whole ears of corn into particulate feed material wherein the ears are initially broken into smaller pieces prior to processing thereof.

2. Description of the Prior Art

Corn is the main ingredient in the feed rations of many types of livestock. Conventionally, it is fed to livestock, such as steers and dairy cows, in three different forms: whole ear, coarse particles, or fine particles. The whole ear form is the least desirable of the three from the standpoint of nutritional value of the animal. Consequently, conventional feed mixtures which utilize the entire corn ear are of two general types: ones that include corn kernels which have been ground into minute particles along with the ground cobs, or others that include cobs which have not been ground but rather are cracked or crushed so that they are in small pieces about the size of the corn kernels which are retained in their whole condition.

The drawbacks of these two conventional feed mixtures have been recognized in the prior art, for example, in U.S. Pat. No. 3,530,913 to Charles M. Kline et al. This patent discloses a corn processor intended to produce a more nutritionally-desirable mixture of the parts of the corn ear. It proposed to provide a uniform and substantially homogeneous mixture of (1) cobs and any husks remaining upon the ears of corn which have been reduced by the processor to a predetermined size readily consumable by livestock, and (2) kernels of corn which have been cracked only a very limited amount. Such a mixture is more desirable in that the cracked kernels afford maximum nutritional value to livestock while the ground cobs and husks provide needed roughage and some extra, though admittedly, limited, nutritional value.

However, the corn processor of the Kline et al patent never became a commercially-available machine. While it may have been capable of producing the above described, more nutritionally-desirable mixture of ear corn parts, it apparently failed to do so on an economically-viable basis. One likely explanation for the corn processor's failure would seem to be that it required a relatively high power input to achieve a commercially-acceptable rate of ear corn throughput in converting the ears of corn to the desired particulate feed material. High power usage would seem to be demanded to operate the components of the corn processor in at least three instances. First, a rotatable sheller unit adapted to handle whole ears of corn, as described and illustrated in the patent, must be of a substantial length and size, and hence requires high torque input for satisfactory operation. Second, because the sheller unit separates kernels from the cobs of whole ears, reduction of the cobs from their initial whole size to desired final particle size apparently has to be carried out in two stages, using two separate grinding units. Third, the over-sized sheller unit needed to process whole ears results in a mismatch with the small size of the cracking unit capable of handling the separated kernels. Thus, an additional powered auger is needed for the sole purpose of feeding kernels discharged from along the long screen of the sheller unit to the location of the much shorter cracking unit.

Consequently, the need still remains for a corn ear processing or converting techniuqe which will produce the desired, nutritionally-improved mixture of the parts of the ear of corn on an economical, cost-effective and commercially-viable basis.

SUMMARY OF THE INVENTION

The present invention provides a whole ear corn conversion apparatus and method designed to satisfy the aforementioned needs. Underlying the present invention is the recognition that the key to an economically-viable ear corn conversion technique is what might be characterized as "preconditioning" of the whole ears of corn, prior to processing them, by breaking each of them down into several smaller pieces. The insight leading to the present invention is the thought that the overall power input requirements to process a given quantity of ears of corn might be less when that quantity is made up of a large number of small broken ear pieces rather than a small number of whole (i.e. large) ears. With the advent of the present invention, conversion of whole ears of corn into a nutritionally-improved mixture of its parts has for the first time become a commerical reality. The unique step forward is initially converting the whole ears into smaller pieces composed of pieces of cob with kernels still attached or intact thereon. The whole ears not preconditioned into the form of smaller ear pieces can then be transferred and processed at commercially-viable throughput rates and power usage levels.

Accordingly, the whole ear corn conversion apparatus and method of the present invention is directed to the operative steps of: (a) receiving whole ears of corn, being in a first condition having lower nutritional value, and breaking the same into smaller pieces; (b) moving the smaller, broken corn ear pieces along a predetermined transfer path; (c) separating the smaller, broken corn ear pieces moved along the transfer path into kernels and pieces of cobs; (d) cracking the separated kernels into smaller pieces; (e) grinding the separated pieces of cobs into fine cob particles; and (f) recombining the smaller, cracked pieces of kernels and fine particles of cobs into a mixture of feed material being in a second condition having higher nutritional value. Simultaneously with breaking of the whole ears into smaller pieces, husks are stripped from the ears. The broken ear pieces and stripped husks are moved such that the ear pieces are thrown and the stripped husks are blown along the transfer path. Further, the broken ear pieces and stripped husks moving along the transfer path can be diverted from the transfer path to the separating step or allowed to by-pass the separating step and continue on directly to the grinding step.

BRIEF DESCRIPTION OF THE DRAWINGS

FIG. 4 is an enlarged fragmentary end sectional view taken along line 4—4 of FIG. 2 showing the breaking and throwing units of the converting apparatus.

FIG. 5 is an enlarged fragmentary end sectional view taken along line 5—5 of FIG. 2, showing the separating and cracking units along with the transfer tube and diverter valve of the converting apparatus.

FIG. 6 is a fragmentary plan sectional view taken along line 6—6 of FIG. 5, showing the transfer tube, diverter valve and separating unit of the converting apparatus.

DETAILED DESCRIPTION OF THE PREFERRED EMBODIMENT

In the following description, right hand and left hand references are determined by standing at the rear of the apparatus and facing in the direction of forward travel. Also, in the following description, it is to be understood that such terms as "forward," "rearward," "left," "upwardly," etc. are words of convenience and not to be construed as limiting terms.

In General

Figure 1:
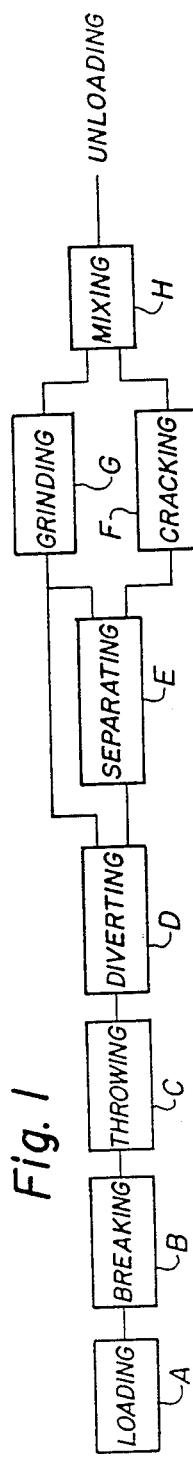
FIG. 1 is a flow chart depicting the overall sequence of steps comprising the whole ear corn converting method of the present invention.
Figure 2:
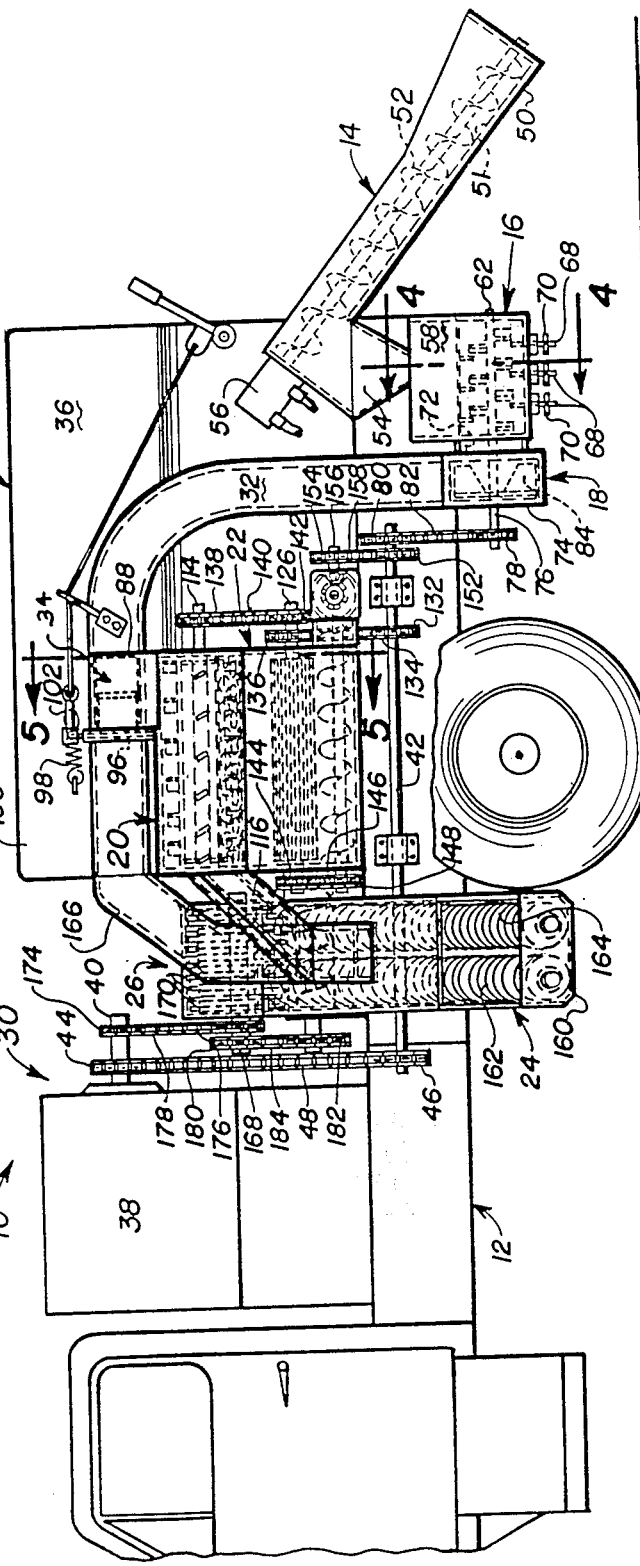
FIG. 2 is a side elevational view of the apparatus for converting whole ear corn embodying the principles of the present invention.
Figure 3:
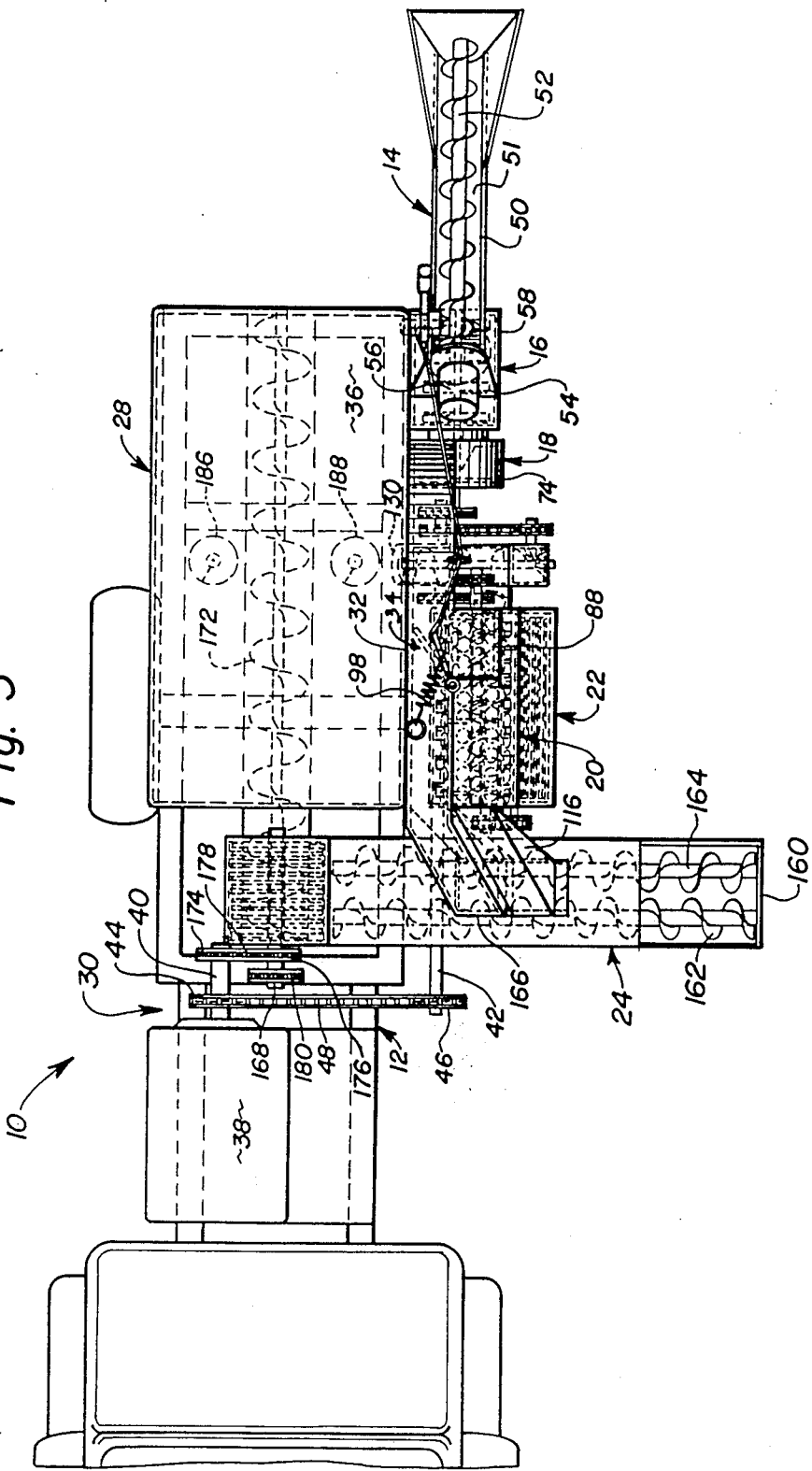
FIG. 3 is a top plan view of the converting apparatus of FIG. 2.

Referring now to the drawings, and particularly to FIGS. 1-3, there is shown the overall sequence of operative steps in FIG. 1 carried out by the machine, generally designated 10 in FIGS. 2 and 3, for converting whole ears of corn into the desired particulate feed material. The machine 10 is provided with a mobile chassis, generally indicated at 12, being in the preferred embodiment a conventional truck chassis. However, the chassis may alternatively be of the pull-type form adapted to be secured to a tractor, or other towing vehicle, located at the front of the chassis, or, on the other hand, may be stationary. The left side of the machine is shown in FIG. 2 when one is standing to the rear of the machine and facing in the direction of forward travel.

The plurality of operative units of the machine 10 which cooperate together to convert whole ears of corn to the desired final feed material are mounted on the mobile chassis 12. These operative units basically include: a main loading conveyor 14, a whole ear corn breaking unit 16, an ear corn pieces throwing unit 18, a separating or corn shelling unit 20, a rollermill or cracking unit 22, an auxiliary transfer conveyor 24, a hammermill or cob grinding unit 26, a batch mixing unit 28 and a drive unit 30.

As depicted in the flow diagram of FIG. 1, block A denotes loading of whole ears of corn into the machine 10 by operation of infeed conveyor 14. Generally, corn ears are fed or shoveled into conveyor 14 from a corn crib or some other storage facility along side of which the machine 10 is parked during operation. The whole ears, usually with some husks attached, are fed by conveyor 14 into the breaking unit 16. As represented by block B, the breaking unit 16 operates to break whole ears into two or three small pieces. In breaking ears, it should be understood that what takes place is that the cob of each ear is broken into several pieces with the corn kernels remaining attached or intact on the individual cob pieces. Simultaneously with breaking the ears, the breaking unit 16 includes appropriate devices for striping off any husks present on the ears. Following next, the broken pieces of ear and stripped husks feed into the throwing unit 18 which is tandemly-arranged and operatively interconnected to the breaking unit 16. The throwing unit 18 includes a transfer tube 32 which defines a transfer path leading to the separating unit 20 and grinding unit 26. As represented by block C in FIG. 1, the throwing unit 18 operates to throw the ear pieces and blow the stripped husks through the tube 32 along its transfer path.

Through the initial use of the breaking unit 16, the corn ear pieces being delivered or moved through the transfer tube 32 by the throwing unit 18 have been effectively "preconditioned" to greatly enhance and facilitate their efficient shelling, cracking, and grinding at units 20, 22, and 26. A diverter valve or gate 34 mounted in the transfer tube 32 is normally positioned to block the transfer path, as seen in FIG. 3, and divert or route the moving "preconditioned" or broken corn ear pieces into the separating unit 20. However, as represented by the two output lines from block D in FIG. 1, the position of the gate 34 may be shifted to allow the broken ear pieces and stripped husks to by-pass the separating unit 20 and continue along the transfer path defined by tube 32 to the grinding unit 26.

At the separating unit 20, as represented by block E in FIG. 1, the smaller, broken corn ear pieces with attached kernels are separated into pieces of cobs and individual kernels by what is known as a conventional corn shelling operation. Separation results in the corn kernels dropping through holes in the bottom of the separating unit 20 while the cob pieces are conveyed laterally to the auxiliary transfer conveyor 24. The rollermill or cracking unit 22 disposed below the separating unit 20 receives the separated kernels, while the hammermill or grinding unit 26 ultimately receives the separated pieces of cobs and husks. The operations performed by cracking and grinding units 22,26, respectively, are presented by blocks F and G in FIG. 1. Cracking of the kernels breaks them into desired size smaller pieces, but does not reduce them to powder form. Grinding of the cob pieces and stripped husks reduces them to a fine particle form. These cracked and ground components or parts of a whole ear of corn are then fed to the mixing unit 28 wherein, as represented by block H, the parts are mixed together and recombined into a more desirable particulate feed material which has higher nutritional value to livestock than that when they were in the whole corn ear form or condition. The feed material may be unloaded from the mixing unit 28 in any suitable manner (not shown), such as by bagging the mixed material, augering it or blowing it, for example, The cracked and ground parts of the whole ear provide the feed material in optimum nutritional condition for feeding to livestock. Rolling or cracking makes the grain kernels more palateble by fracturing the outside hull of the kernel and letting the digestive juices of the livestock penetrate the softer parts of the kernel which by being maintained in a coarse particle form are relatively dust-free. The coarseness of the cracked kernels avoids compaction of the feed material and better assimilates the digestable nutrients of the grain. On the other hand, the fine ground cobs and husks mixed in with the rolled or cracked kernels eliminates separation of the mixed corn ear parts in the feed storage bin or silo and provides increased bulk in the feed ration. Other ingredients such as oats, alfalfa pellets, molasses, vegetable oil, etc. can also be added to the feed mixture.

DETAILS OF THE CONVERSION MACHINE

As best seen in FIG. 3, the loading conveyor 14, breaking unit 16, throwing unit 18, separating unit 20 and cracking unit 22 are all supported by suitable frame structure (not shown) along the left side of the mobile chassis 12 of the machine 10. Most of the space on the mobile chassis 12 is occupied by a bulk tank 36 of the mixing unit 28 and an engine 38 of the drive unit 30. The drive unit 30 also includes a drive train composed of the output shaft 40 of the engine 38, an elongated jack shaft 42 rotatably mounted along the left side of the mobile chassis 12, as seen in FIG. 1, and a pair of sprockets 44,46 and a drive chain 48 interconnecting the sprockets. Drive sprocket 44 is fixedly mounted on the engine output shaft 40, while driven sprocket 46 is fixedly mounted on the forward end of the jack shaft 42. As can be appreciated, in the alternative, the drive may be composed of belts and suitable sheaves.

The main loading conveyor 14 supported at the left rear of the mobile chassis 12 includes a trough 50 having a flared open top for receiving whole ears of corn therein at the lower end of the trough, and having an auger 52 rotatably mounted along the bottom 51 of the trough 50 for moving the ears of corn up the inclined trough bottom 51 to a discharge chute 54 at the upper end of trough 50. The auger 52 may be powered by any suitable means, for example, by a hydraulic motor 56 mounted on the discharge chute end of the conveyor trough 50.

As seen in FIG. 2 and more clearly in FIG. 4, the breaking unit 16 includes a housing 58 which has a top inlet opening 60 into which the discharge chute 54 of the loading conveyor 14 is inserted. Whole ears of corn thus being conveyed by auger 52 upon reaching the upper end of trough 50 drop through discharge chute 54 and into the housing 58 of the breaking unit 16. The breaking unit 16 also includes a main shaft 62 which is rotatably mounted at its rear end to the rear end of the housing 58 and extends through an outlet opening 64 at the front end of the housing 58. The whole ears of corn upon dropping into the housing 58 will encounter a plurality of rotating breaker arms 66 and stationary stripper bars 68 within the housing. The breaker arms 66 are mounted in axially spaced relationship along, and extend radially from, the main shaft 62 for rotation therewith. The stripper bars 68 are mounted through the housing 58 so as to extend toward the main shaft 62 and are disposed in an axially spaced relationship, also, relative to one another and to the breaker arms 66 along the shaft 62. Furthermore, the stripper bars 68 are threaded and have knobs 70 on their outer ends which are located outside the housing 58. By rotating the knobs 70 either clockwise or counter-clockwise the bars 68 can be movably adjusted toward or away from the main shaft 62. In such manner, the stripper bars 68 can be preset to effectuate satisfactory stripping of husks from the corn ears. So, upon rotation of the main shaft 62, the stripper bars and breaker arms coact to strip husks from the ears and impact the ears so as to break the ears into several smaller pieces by a snapping action which leaves substantially all of the kernels intact on the broken corn ear pieces. Substantially all of the kernels left intact on the broken ear pieces along with any kernels which might have been separated therefrom by the snapping action occurring in the breaking unit 16 are relatively unaffected by the snapping action, being left in a substantially uncracked or unbrokened condition before their entry subsequently into the cracking unit 22 via the separating unit 20.

Stripped husks and broken pieces of ears flow from the breaking unit 16 through its front end outlet opening 64 and into a rear end infeed port 72 in the casing 74 of the throwing unit 18, the port 72 being in flow communication with the outlet opening 64. The throwing unit 18 also includes a central shaft 76 which is rotatably mounted at its forward end to the front end of the casing 74 and extends through the infeed port 72 thereof. The throwing unit central shaft 76 is connected at its rear end to the forward end of the main shaft 62 of the breaking unit 16 for rotation therewith about a common axis. In such manner, as seen in FIG. 2, both the breaking unit 16 and the throwing unit 18 are operated by what is, in effect, a common shaft. It has an end sprocket 78 which is drivingly coupled to a drive sprocket 80 on the rear end of the jack shaft 42 by a drive chain 82. Consequently, whenever the breaking unit 16 is operated so is the throwing unit 18. Now, the husks and broken ear pieces upon entering the throwing unit casing 74 will encounter a rotating impeller 84, as also seen in FIG. 4. The impeller 84 is mounted to the central shaft 76 for rotation therewith. The impeller 84 creates a negative pressure upon rotation with shaft 76 which causes inflow of broken corn ear pieces and stripped husks from the breaking unit 16 and outflow thereof through a top discharge port 86 and along the transfer tube 32, which is connected to the casing 74 in flow communication with the discharge port.

The transfer tube 32 defines a generally inverted U-shaped transfer path along which the thrown ear corn pieces and stripped husks will travel, beginning at the throwing unit casing 74 and terminating at the auxialiary transfer conveyor 24 adjacent the grinding unit 26. In the middle, horizontal portion, the transfer tube 32 extends over and adjacent to the inboard side of the separating unit 20, as seen in FIGS. 2 and 3 and more clearly in FIGS. 5 and 6. At this portion of tube 32, the moving broken ear pieces and stripped husks can be diverted into the separating unit 20 or allowed to by-pass it due to operation of the diverter valve 34. The valve 34 includes a box-like chute 88 having an open bottom 90 which opens into the separating unit 20 and an open inboard side 92 which communicates with the transfer tube 32. The chute 88 thus provides flow communication between the separating unit 20 and transfer tube 32. Further, a door 94 is pivotally mounted by a vertical shaft 96 at the intersection of the forward or downstream side of the chute 88 and the transfer tube 32. A resilient spring 98 extending between an inboard wall 100 of the tank 36 and an arm 102 fixed to the top of the shaft 96 biases the door 94 to a first position (shown in solid line in FIG. 6) in which it blocks the transfer tube 32 and causes diverting of the broken ear pieces and stripped husks from the transfer path through the chute 88 and into the top of the separating unit 20. A pivoting actuating lever 104 at the rear end of the tank 36 is connected by a cable 106 to the shaft arm 102 on the door 94 and is operable to move the door 94 against the bias of spring 98 to a second position (shown in dashed line in FIG. 6) in which it closes the open side 92 of the chute 88 and thus allows the moving broken ear pieces and stripped husks to by-pass the separating unit 20. It should be pointed out that normally the door 94 will occupy its first position, diverting flow, or allowing access, to the separating unit 20.

As seen in FIGS. 2 and 3, and more clearly in FIG. 5, separating unit 20 and cracking unit 22 are aligned in tandem relationship in a common housing 108 in which the cracking unit is disposed below the separating unit. The open bottom 90 of the diverter valve chute 88 provides top inlet opening to the housing 108 adjacent its rear end. Broken corn ear pieces and stripped husks funnel down through the open chute bottom 90 and immediately encounter a plurality of rotating threshing bars 110 and stationary vanes 112 disposed respectively on a central shaft 114 and the interior wall of the housing 108. The threshing bars 110 are mounted in axially spaced relationship along, and extend radially from, central shaft 114, which is rotatably mounted at the opposite ends to the housing 108. The bars 110 and vanes 112 coact upon rotation of the shaft to shell the corn kernels from the ear corn cob pieces and at the same time convey the separated husks and cobs in an axial direction forwardly through a chute 116 which discharges the pieces of cobs and the husks into the auxiliary transfer conveyor 24. On the other hand, the separated, shelled kernels fall vertical by gravity to and through a bottom screen or concave 118 which bridges the inboard and outward sides of the housing 108. The cracking unit 22 is composed of a pair of rollers 120 and 122 having longitudinally-extending crimping elements or serrations on the peripheries thereof. The rollers 120,122 are mounted for rotation with shafts 124,126 which space the rollers apart a preset distance to achieve the desired crimping or cracking of the kernels. The shafts 124,126 are rotatably mounted at their front and rear ends to the housing 108. The rollers 120,122 provide the cracking unit 22 with a working area which is axially coextensive with the working area provided by the threshing bars 110 and vanes 112 of the separating unit 20. Therefore, end-to-end flow communication exists between the units 20,22 through the concave 118. The kernels will therefore gravity feed to all working regions of the cracking unit 22 from all working regions of the separator unit 20, thereby avoiding the need for any intervening device to convey the kernels between the units. The kernels are cracked into several smaller pieces upon passing through the nip of the rollers 120 and 122. The cracked kernel pieces fall into a discharge auger 128 located below the rollers which conveys the kernel pieces from the cracking unit 22 to another transfer auger 130 (see FIG. 3) disposed at 90 degrees to the discharge auger 128. The auger 130, in turn, conveys the cracked kernel pieces into the lower portion of the bulk tank 36.

Rotary drive power to the shaft 114 of the separating unit 20 and the shafts 124,126 of the craking unit 22 is provided from the jack shaft 42. Specifically, a sprocket 132 on the jack shaft 42 is drivingly connected by chain 134 to an inner sprocket 138 on inboard roller shaft 126, while a sprocket 138 on the central shaft 114 of the separating unit 20 is drivingly connected by chain 140 to an outer sprocket 142 on the inboard roller shaft 126. The inboard roller shaft 126 drives the outboard roller shaft 124 via intermeshing gears (not shown) such that the rollers counterrotate relative to one another. The outboard roller shaft 124 transmits rotary drive power at its forward end to the discharge auger 128. Specifically, sprocket 144 on outboard roller shaft 124 is drivingly connected by chain 146 to sprocket 148 on auger 128. The transfer auger 130 is driven through a right angle gear box 150 which is drivingly connected to the jack shaft 42 by a sprocket 152 on the jack shaft, a sprocket 154 on the gear box input shaft 156, and a drive chain 158 extending between and drivingly connecting the two sprockets 152,154.

Auxiliary transfer conveyor 24 fulfills several functions. First, it receives separated pieces of cobs and husks from the separating unit 20 and delivers them to the grinding unit 26. Second, it receives broken corn ear pieces which are delivered directly to it via transfer tube 32, bypassing the separating means, and conveys such pieces into the grinding unit 26. Finally, other feed materials can be placed directly into the transfer conveyor 24 and delivered to the grinding unit 26, by-passing all of the other units of the machine 10. For example, this is the way in which baled hay are added to the feed ration being prepared in the machine 10. In the illustrated embodiment, the transfer conveyor 24 includes rectangular trough 160 open at its lower end with a pair of counterrotating augers 162,164 mounted in the trough and driven by suitable means, for instance, a hydraulic motor (not shown).

The broken pieces of corn cobs and stripped husks are thus routed to the grinding unit 26 (or hammermill) by the transfer conveyor 24 via the discharge chute 116 from the separating unit 20. Additionally, broken corn ear pieces can be routed to the grinding unit 26 directly from the terminal end 166 of the transfer tube 32. The grinding unit 26 has a central shaft 168 and a plurality of closely spaced radial hammers 170 mounted on the shaft 168 which upon rotation of the shaft coact with a screen (not shown) in a conventional manner to grind or comminute the feed material fed into the grinding unit. The ground material falls through the screen to a forward portion of a main conveyor 172 which moves the ground material in a rearward direction and into the tank 36 of the mixing unit 28. The grinding unit central shaft 168 is driven directly from the output shaft 40 of the engine via sprockets 174, 176 fixed mounted on the respective shafts 40,168 and a drive chain 178 which interconnects the sprockets. The central shaft 168 of the grinding unit 26, in turn, drives the main conveyor 172 of the mixing unit 28 via sprockets 180,182 which are drivingly interconnected by chain 184.

The bulk tank 36 of the batch mixing unit 28 receives cracked kernel pieces via transfer auger 130 and ground cobs and husks via main conveyor 172. Also, a pair of vertical augers 186,188 are generally centrally disposed within the tank 36 near auger 130 and conveyor 172 and are operable to recirculate the fine ground particles of cobs and pieces of cracked kernels in the tank 36 so as to uniformly mix them together into the desired homogeneous particulate feed mixture. As mentioned earlier, unloading of the fed mixture from the tank 36 can be accomplished by any suitable conventional means (not shown), for instance, by a discharge auger or blower.

It is thought that the present invention and many of its attendant advantages will be understood from the foregoing description and it will be apparent that various changes may be made in the steps of the method, and the form, construction and arrangements of the parts of the apparatus, described without departing from the spirit and scope of the invention or sacrificing all of its material advantages, the form hereinbefore described being merely a preferred or exemplary embodiment thereof.

We claim:

1. A method of converting a livestock feed material, such as whole ears of corn, from a first condition having lower nutritional value into a second condition having higher nutritional value, comprising the steps of:
   (a) receiving whole ears of corn, being in said first condition, and breaking the same into smaller pieces by impacting the whole ears to cause a snapping action which breaks the ears but leaves substantially all of the kernels intact on the broken ear pieces, said kernels intact on the broken ear pieces along with any kernels separated therefrom being relatively unaffected by said snapping action so as to be left in a substantially unbroken condition precedent to a subsequent cracking thereof;
   (b) stripping husks from said corn ears simultaneously with said breaking of said whole ears of corn into said smaller pieces;
   (c) throwing and blowing said smaller, broken corn ear pieces together with any separated kernels and stripped husks upwardly along a predetermined transfer path;
   (d) separating said smaller, broken corn ear pieces moved along said transfer path into kernels and pieces of cobs and husks;
   (e) cracking said kernels separated by said snapping action and said kernels separated in said immediately preceding separating steps into smaller pieces;
   (f) grinding said separated pieces of cobs and husks into fine cob and husk particles; and
   (g) recombining said smaller, cracked pieces of kernels and fine particles of cobs and husks into a mixture of feed material being in said second condition.

2. The method as recited in claim 1, further comprising the steps of:
   diverting said broken corn ear pieces from along said transfer path precedent to said separating step when it is desired to bypass said separating step.

3. The method as recited in claim 1, further comprising the step of:
   feeding other feed material along an auxiliary transfer path precedent to said grinding step.

4. In a method for converting whole ears of corn into a desired particulate feed material including the steps of separating the kernels and cobs of the corn ears and then cracking and grinding them, respectively, before recombining them into said particulate feed material, the improvement comprising the steps of:
   (a) receiving whole ears of corn and breaking them into smaller pieces by impacting the whole ears to cause a snapping action which breaks the ears but leaves substantially all of the kernels intact on the broken ear pieces, said kernels intact on the broken ear pieces along with any kernels separated therefrom being relatively unaffected by said snapping action so as to be left in a substantially unbroken condition precedent to said subsequent cracking thereof;
   (b) stripping husks from said corn ears simultaneously with said breaking of said whole ears of corn into said smaller pieces; and
   (c) throwing and blowing the smaller, broken corn ear pieces together with any separated kernels and stripped husks upwardly along a predetermined transfer path precedent to said separating step.

* * * * *